D. M. SOMERS.
Manufacture of Metal Tubing.

No. 167,796. Patented Sept. 14, 1875.

Witnesses:
Michael Ryan
Fred. Haynes

D. M. Somers
by his Attorneys
Brown & Allen

UNITED STATES PATENT OFFICE.

DANIEL M. SOMERS, OF BROOKLYN, NEW YORK.

IMPROVEMENT IN THE MANUFACTURE OF METAL TUBING.

Specification forming part of Letters Patent No. 167,796, dated September 14, 1875; application filed April 13, 1874.

*To all whom it may concern:*

Be it known that I, DANIEL M. SOMERS, of Brooklyn, in the county of Kings and State of New York, have invented an Improved Metal Tubing, of which the following is a specification:

My invention relates to a method of manufacturing short tubing suitable for pen-holder barrels, cartridges, spinning-bobbins, ferrules, &c. Heretofore short tubing for the purposes mentioned has been made by taking a disk of metal and forcing it by means of plungers into suitable dies until it assumes the desired contour or thickness; by bending a blank of metal into U shape, and then forming it by movable dies into a tube, and then soldering or brazing its edges; by drawing a long blank of metal through a die, then brazing or soldering its edges, and then cutting it into the proper lengths, and by other methods even more expensive than these.

The first method requires costly and nicely-adjusted machinery to carry it out. The second method is open to the objection that a perfectly cylindrical tube cannot be produced by it. The first and third methods prevent the configuration of the ends of the tube except by milling or cutting on a mandrel, both of which are slow and expensive operations.

To obviate the objections to these and other methods of producing a tube whose edges shall be united, and to make one which shall have a perfectly symmetrical contour, is the object of my invention; and it consists in the method of making tubes hereinafter described.

Figure 3:
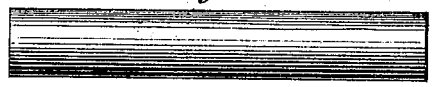
Figure 2:
Figure 1:
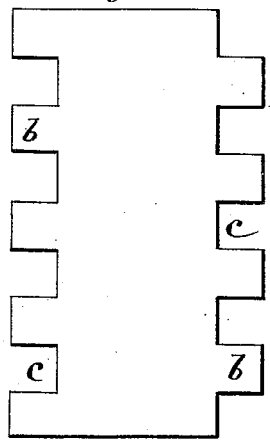

In the accompanying drawing, Figure 1 represents a face view of a blank of metal having its edges provided with projections which interlock when it is bent into tubular form. Fig. 2 is a longitudinal view of a tube bent into shape from said blank. Fig. 3 is a longitudinal view of a tube after being coated with soft metal or an alloy, and then drawn through dies.

From a sheet of metal I cut a blank of the desired length and configuration, and bend it into a tube by means of devices such as are shown in my patent granted August 20, 1872, for improvement in tube-making machines, or by any of the well-known means in common use. I then coat its entire surface with a soft metal or alloy, which unites its edges, and then force it by means of a mandrel through a die or dies, substantially such as are described and shown in my patent granted June 16, 1874, for improvement in dies for drawing tubes. It is then of uniform thickness, and perfectly cylindrical; its edges are united so that the joint is hardly perceptible to the eye; its ends are left the contour designed by the cutting of the blank; its external and internal surfaces are smooth, and capable of receiving a high finish; and it is non-corrosive. It is then in a condition to be employed for any of the purposes hereinbefore set forth. To produce a better finish I plate it with any desired metal; but this is not essential to my invention. The blank from which the tube is formed may have its edges made with projections that interlock, as shown in Fig. 2, and which may be of various forms, or its edges may be straight. By properly constructing the devices for cutting the blank, bending it into a tube, and the die or dies through which it is forced, the said tube may be formed with longitudinal grooves, or of a polygonal or any other desired contour.

I am aware that solid iron tubes, with their edges welded in the ordinary way, have been coated with tin, and then drawn through dies, and also that tubes have been formed by cutting a blank into the desired shape, then forming it into a tube, and uniting its edges by soldering or brazing, and therefore make no claim to the same.

What I do claim as my invention, and desire to secure by Letters Patent, is—

The method of making short metallic tubing by bending a blank of metal into a tubular form, then coating its entire surface with soft metal or alloy, which unites its edges, and then forcing the same by a mandrel through dies, substantially as described.

D. M. SOMERS.

Witnesses:
M. RYAN,
VERNON H. HARRIS.